United States Patent
Fischer et al.

(10) Patent No.: US 11,498,509 B2
(45) Date of Patent: Nov. 15, 2022

(54) ROOF MOUNTED PASSENGER AIRBAG

(71) Applicant: ZF Passive Safety Systems US Inc., Washington, MI (US)

(72) Inventors: Kurt Fischer, Rochester, MI (US); Gabriela Diaz, Royal Oak, MI (US); Douglas Gould, Lake Orion, MI (US)

(73) Assignee: ZF PASSIVE SAFETY SYSTEMS US INC., Washington, MI (US)

( * ) Notice: Subject to any disclaimer, the term of this patent is extended or adjusted under 35 U.S.C. 154(b) by 0 days.

(21) Appl. No.: 17/226,267

(22) Filed: Apr. 9, 2021

(65) Prior Publication Data
US 2022/0324408 A1 Oct. 13, 2022

(51) Int. Cl.
| | | |
|---|---|---|
| *B60R 21/214* | (2011.01) | |
| *B60R 21/261* | (2011.01) | |
| *B60R 21/217* | (2011.01) | |
| *B60R 21/26* | (2011.01) | |
| *B60R 21/237* | (2006.01) | |
| *B60R 21/231* | (2011.01) | |

(52) U.S. Cl.
CPC ........ *B60R 21/214* (2013.01); *B60R 21/2176* (2013.01); *B60R 21/237* (2013.01); *B60R 21/26* (2013.01); *B60R 21/261* (2013.01); *B60R 2021/23192* (2013.01)

(58) Field of Classification Search
CPC . B60R 21/213; B60R 21/214; B60R 21/2176; B60R 21/261; B60R 2021/0253; B60R 2021/23192; B60R 2021/2612
See application file for complete search history.

(56) References Cited

U.S. PATENT DOCUMENTS

| | | | | |
|---|---|---|---|---|
| 3,687,485 | A * | 8/1972 | Campbell | B60R 21/08 280/733 |
| 5,265,903 | A * | 11/1993 | Kuretake | B60R 21/213 280/730.2 |
| 5,899,489 | A * | 5/1999 | Jost | B60N 2/5883 280/730.2 |
| 11,214,217 | B2 * | 1/2022 | Gould | B60R 21/214 |
| 2003/0052476 | A1 * | 3/2003 | Rose | B60R 21/2171 280/730.2 |
| 2003/0218324 | A1 * | 11/2003 | Ju | B60R 21/26 280/743.1 |
| 2004/0066022 | A1 * | 4/2004 | Mori | B60R 21/214 280/730.1 |
| 2004/0090050 | A1 * | 5/2004 | Dominissini | B60R 21/213 280/730.1 |

(Continued)

*Primary Examiner* — Barry Gooden, Jr.
(74) *Attorney, Agent, or Firm* — Tarolli, Sundheim, Covell & Tummino LLP

(57) ABSTRACT

An apparatus for helping to protect an occupant of a vehicle includes an airbag configured to inflate and deploy away from a vehicle roof toward a vehicle seat. The airbag includes a base portion configured to be connected to the vehicle roof and a cushion portion in fluid communication with the base portion. The cushion portion extends from the base portion toward the vehicle seat to an inflated and deployed condition in which the cushion portion is configured to receive and cushion an occupant seated on the vehicle seat. The apparatus also includes a deployment pocket for initially restricting the deployment of the cushion portion without restricting the base portion.

24 Claims, 3 Drawing Sheets

(56) References Cited

U.S. PATENT DOCUMENTS

| | | | |
|---|---|---|---|
| 2005/0040627 A1* | 2/2005 | DePottey | B60R 21/214 |
| | | | 280/730.1 |
| 2005/0040667 A1* | 2/2005 | Schneider | B60R 21/214 |
| | | | 296/97.12 |
| 2005/0062272 A1* | 3/2005 | Smith | B60R 21/26 |
| | | | 280/737 |
| 2005/0253366 A1* | 11/2005 | Uno | B60R 22/203 |
| | | | 280/730.2 |
| 2007/0052220 A1* | 3/2007 | Hidaka | B60R 21/213 |
| | | | 280/730.2 |
| 2010/0301591 A1* | 12/2010 | Kwon | B60R 21/215 |
| | | | 280/743.2 |
| 2010/0327567 A1* | 12/2010 | Choi | B60R 21/2176 |
| | | | 280/730.2 |
| 2012/0080869 A1* | 4/2012 | Lee | B60R 21/214 |
| | | | 280/729 |
| 2014/0375033 A1* | 12/2014 | Fukawatase | B60R 21/231 |
| | | | 280/729 |
| 2017/0043738 A1* | 2/2017 | Peyre | B60R 21/214 |
| 2017/0113646 A1* | 4/2017 | Lee | B60R 21/2338 |
| 2018/0272985 A1* | 9/2018 | Nagasawa | B60R 21/231 |
| 2019/0161048 A1* | 5/2019 | Thomas | B60R 21/215 |
| 2019/0161049 A1* | 5/2019 | Thomas | B60R 21/215 |
| 2020/0269799 A1* | 8/2020 | Iwata | B60R 21/213 |
| 2020/0276954 A1* | 9/2020 | Navarro Arranz | |
| | | | B60R 21/2338 |
| 2020/0391688 A1* | 12/2020 | Schroeder | B60R 21/26 |
| 2020/0406852 A1* | 12/2020 | Fischer | B60R 21/26 |

* cited by examiner

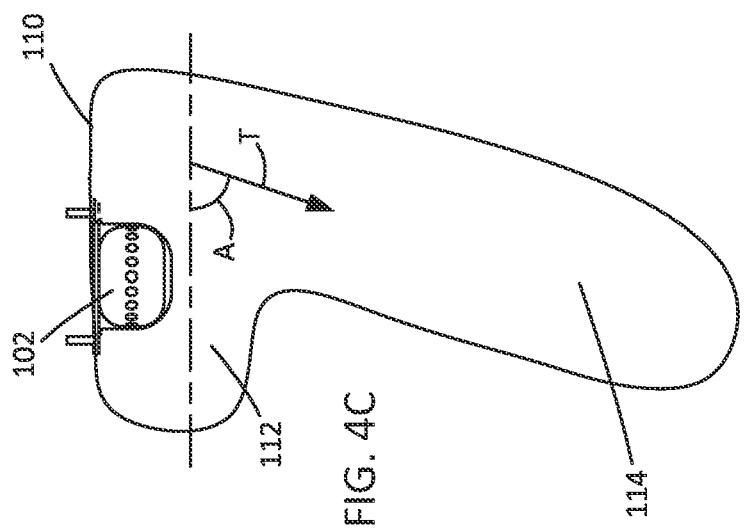
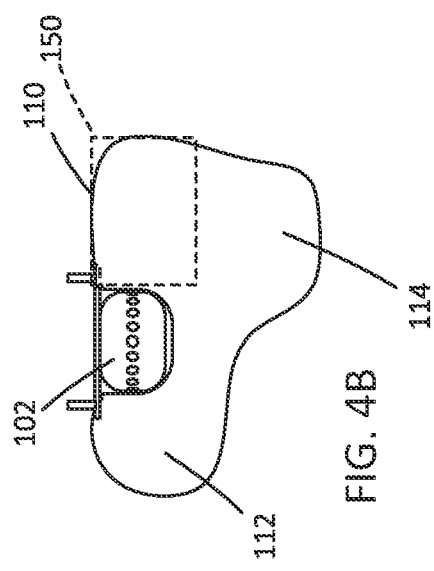
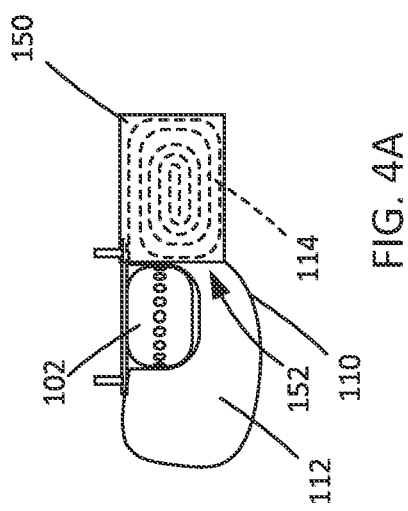

ROOF MOUNTED PASSENGER AIRBAG

BACKGROUND

It is known to provide an inflatable vehicle occupant protection device, such as an airbag, for helping to protect an occupant of a vehicle. One particular type of airbag is a frontal airbag inflatable between an occupant of a front seat of the vehicle and an instrument panel of the vehicle. Such airbags may be driver airbags or passenger airbags. When inflated, the driver and passenger airbags help protect the occupant from impacts with parts of the vehicle such as the instrument panel and/or a steering wheel of the vehicle.

Passenger airbags are typically stored in a deflated condition in a housing that is mounted to the vehicle instrument panel. An airbag door is connectable with the housing and/or instrument panel to help enclose and conceal the airbag in a stored condition. Upon deployment of the passenger airbag, the airbag door opens to permit the airbag to move to an inflated condition. The airbag door opens as a result of forces exerted on the door by the inflating airbag.

Driver airbags are typically stored in a deflated condition in a housing that is mounted on the vehicle steering wheel. An airbag cover is connectable with the housing and/or steering wheel to help enclose and conceal the airbag in a stored condition. Upon deployment of the driver airbag, the airbag cover opens to permit the airbag to move to an inflated condition. The airbag cover opens as a result of forces exerted on the cover by the inflating driver airbag.

There are trends in the auto industry to make vehicles more spacious. Styling has been making the instrument panel smaller and thus farther away from the occupant. Looking further into the future, driverless, autonomous vehicles are even more spacious. Autonomous vehicles have been contemplated for some time, and now their adaption on a large scale is approaching. Autonomous vehicles can eliminate some of the structure traditionally relied upon for supporting various vehicle safety devices.

With these realities as a backdrop, the paradigm of occupant safety systems must shift. In the past, the necessity of a vehicle operator/driver lent to a somewhat standard vehicle passenger cabin configuration. In the U.S., the driver is a front seat, left side, forward facing occupant within reach of the vehicle controls and instrumentation (steering wheel, pedals, instrument panel, console, etc.). This driver configuration helps dictate the layout of the remainder of the vehicle—front seat, forward-facing passenger-side occupant, rear seat (second row, third row, etc.) forward-facing occupants. Accordingly, in the past, occupant safety systems were typically designed with this passenger cabin layout and the associated occupant positions and orientations in mind.

The autonomous vehicle eliminates the operator/driver, which eliminates the necessity of their being positioned and oriented in the conventional manner. Vehicle manufacturers are free utilize passenger cabin space as they see fit without being constrained to predetermined passenger arrangements, such as all forward-facing occupants, or vehicle structural configurations, such as steering wheel/instrument panel configurations, center console configurations, foot well pedal controls, etc.

This presents the challenge of not only where to locate airbag systems, but also finding a reaction surface against which to position the airbag so that it can absorb impacts. Typically, instrument panel and steering wheel mounted frontal airbags utilize those structures as a reaction surface against which the airbag rests so that it can oppose, cushion, and absorb the impact energy of an impacting occupant and provide a desired ride-down effect. In the autonomous vehicles, however, the vehicle may not have an instrument panel or steering wheel at all, and the occupants can be positioned and oriented outside the traditional manner. This can make it difficult or impossible to utilize traditional structures in the vehicle as reaction surface.

SUMMARY

A roof mounted airbag module includes an airbag including a base portion and a cushion portion. The base portion is secured to the airbag module adjacent the roof and supports the airbag from the roof. When the airbag is deployed, the base portion is positioned adjacent the roof and the cushion portion extends downward from the roof to a position in front of a vehicle occupant. The deployed cushion portion receives and cushions the occupant.

The base portion of the airbag helps control the deployment trajectory, and helps position the cushion portion in the deployed position. To help prevent the cushion from engaging the occupant's head during downward deployment from the roof, the airbag module includes a wrap that restricts initial deployment of the cushion portion so that the base can reach a degree of inflation and pressurization sufficient to control the deployment trajectory of the cushion portion so as to avoid engaging the occupant's head.

An apparatus for helping to protect an occupant of a vehicle includes an airbag configured to inflate and deploy away from a vehicle roof toward a vehicle seat. The airbag includes a base portion configured to be connected to the vehicle roof and a cushion portion in fluid communication with the base portion. The cushion portion extends from the base portion toward the vehicle seat to an inflated and deployed condition in which the cushion portion is configured to receive and cushion an occupant seated on the vehicle seat. The apparatus also includes a deployment pocket for initially restricting the deployment of the cushion portion without restricting the base portion.

According to one aspect, the deployment pocket can include a deployment opening through which the cushion portion deploys. The deployment pocket can be configured to release the cushion portion through the deployment opening in the pocket without rupturing.

According to another aspect, the cushion portion can be packaged in the deployment pocket in a rolled and/or folded condition configured so that when the cushion portion is inflated, it unrolls and/or unfolds through the deployment opening.

According to another aspect, the cushion portion can be placed in the rolled and/or folded condition from the bottom up in a roll/fold direction configured to roll/fold into the pocket along a pocket panel.

According to another aspect, the apparatus can also include an airbag housing that encloses the base portion and the cushion portion in a packaged condition of the airbag. The airbag housing can be configured to rupture in response to initial airbag inflation and release the airbag for inflation and deployment. The cushion portion can also be packaged in the deployment pocket inside the airbag housing. The airbag housing can be a fabric housing that at least partially surrounds the airbag in the packaged condition. The deployment pocket can be a fabric structure stitched to the airbag housing. The deployment pocket can be configured to restrict deployment of the cushion portion until after the airbag housing ruptures.

According to another aspect, the apparatus can also include an inflator for inflating the airbag. The airbag housing can enclose the airbag and inflator in a packaged condition.

According to another aspect, the deployment pocket can be configured to rupture to release the cushion portion to inflate and deploy. The apparatus can also further include an airbag housing that encloses the base portion and the cushion portion in a packaged condition of the airbag. The airbag housing can be configured to rupture in response to initial airbag inflation and release the airbag for further inflation and deployment. The deployment pocket can be configured to rupture after the airbag housing ruptures in order to initially restrict inflation and deployment of the cushion portion.

According to another aspect, the base portion can have a first end and an opposite second end spaced along a length of the base portion. The base portion in the inflated and deployed condition can be configured so that its length extends along the vehicle roof. The cushion portion can be connected to the second end of the base portion, and can be configured to extend away from the roof and the base portion at an acute angle downward in the vehicle toward the vehicle seat. The cushion portion can be configured to extend toward an intersection of a seat back and bottom cushion of the vehicle seat. The cushion portion can have has an upper portion and a lower portion measured along a length of the cushion portion. The upper portion of the cushion portion can be connected to the second end of the base portion.

According to another aspect, the base portion can have an axis along which its length is measured, and the base portion axis can extend generally horizontally when the airbag is inflated and deployed. The cushion portion can have an axis along which its length is measured, and the cushion portion axis can extend at an acute angle with the base portion axis in a downward direction away from the roof toward the vehicle seat. The cushion portion can be configured to extend toward an intersection of a seat back and bottom cushion of the vehicle seat. The cushion portion can be configured to engage an occupant in the area of the upper legs so that the upper legs help form a reaction surface for supporting the cushion portion.

According to another aspect, the upper legs and vehicle roof can form reaction surfaces for the airbag.

According to another aspect, the base portion can be configured to support the cushion portion against the vehicle to control a deployment trajectory of the cushion portion.

According to another aspect, an airbag module includes the airbag, an inflator for inflating the airbag, and a housing for at least partially enclosing the inflator, deployment pocket, and airbag in a deflated and stored condition. The airbag module can be configured to be mounted to the vehicle roof.

According to another aspect, the airbag module can be implemented in a vehicle safety system that can include a sensor for sensing the occurrence of an event for which airbag deployment is desired and a controller operatively connected to the sensor and the inflator. The controller can be configured to actuate the inflator in response to the sensor sensing the occurrence of the event for which airbag deployment is desired.

DRAWINGS

The foregoing and other features will become apparent to one skilled in the art to which this disclosure relates upon consideration of the following description with reference to the accompanying drawings, in which.

FIGS. 4A-C are schematic views illustrating the deployment of an airbag from the airbag module.

DESCRIPTION

Figure 1:
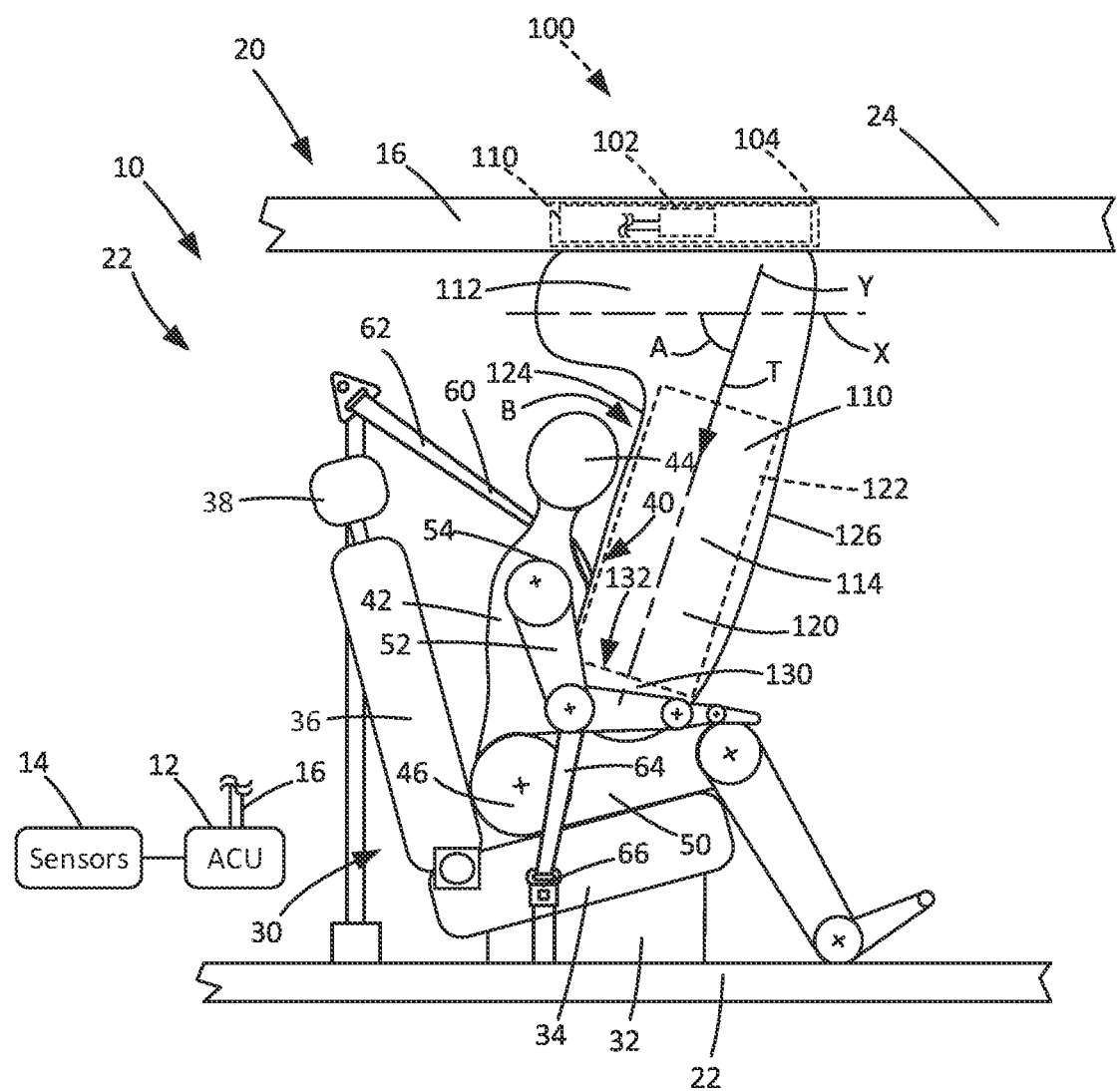
FIG. 1 is a schematic illustration depicting an apparatus for helping to protect an occupant of a vehicle, according to an example configuration.

A vehicle safety system 10 helps protect an occupant 40 of a vehicle 20. Referring to FIG. 1, the vehicle 20 includes a vehicle seat 30 upon which a vehicle occupant 40 is seated. The vehicle seat 30 includes a base 32 connected to the vehicle 20, e.g., to the floor 22. The seat base 32 supports a seat bottom cushion 34. A seatback 36 extends upward from the seat bottom 34 and has a reclined position that can be adjusted. A headrest 38 is positioned at an upper end of the seatback 36.

The occupant 40 is restrained by a seatbelt 60, which is a conventional three-point restraint including a shoulder belt portion 62 that extends across the occupant's shoulder 54, and a lap belt portion 64 that extends across the occupant's lap, i.e., where the legs 50 meet the torso 42. The seatbelt 60 is secured via a buckle 66, which is anchored to the vehicle 20.

The occupant 40 is seated on the seat 30, with his/her torso 42 leaned forward from the seatback 36 in response to a vehicle collision. The occupant's head 44 is positioned at or near the headrest 38, and hips/buttocks 46 and legs 50 (more specifically upper legs) resting on the seat bottom cushion 34. The lap belt portion 64 of the seatbelt 60 maintains the hips/buttocks 46 rearward on the seat base 34 at the intersection with the seat back 36. The occupant's lower legs extend from the knee, which is bent at the front edge of the bottom cushion 36 downward toward the vehicle floor 22, where the occupant's feet rest. The occupant's legs would eventually flex at the knee and the lower legs would kick forward in response to the collision. In the typical occupant position of FIG. 1, the occupant's arms 52 are at his/her side, bent at the elbows with the lower arms/forearms and hands resting on the legs 50. The arms 52 would also eventually extend/mover forward in response to the collision.

The vehicle safety system 10 includes an airbag module 100 mounted in a roof 24 of the vehicle 20. In the example configuration illustrated in FIG. 1, the occupant 40 is shown in the passenger compartment 22 without any surrounding vehicle structure, such as an instrument panel or seats positioned in front of the occupant. This can be the case, for example, with an autonomous vehicle. The vehicle safety system 10, and the roof mounted airbag module 100 thereof can, however, be implemented in any vehicle configuration where occupant airbag protection is desired. The safety system 10 is not limited to an autonomous vehicle implementation, and can be applied to any vehicle where a roof-deployed airbag is desired.

The airbag module 100 includes an airbag 110 and an inflator 102 that is actuatable to provide inflation fluid for inflating and deploying the airbag. The airbag 110 and inflator 102 are packaged in a housing 104. The housing 104 protects the airbag 110 from damage both prior to and after installation in the vehicle 20. The housing 104 can, for example, be a "soft-pack" housing constructed of fabric, such as airbag fabric, that is wrapped around and contains the airbag 110 and inflator 102 in a stored condition.

The airbag 110 can be placed in the stored condition in a variety of manners. For example, the airbag 110 can be rolled and/or folded to place the airbag in the stored condition. "Rolling" and "folding," as used herein, are general terms that can be applied in a variety of manners. For example, folds can be formed by rolling up the airbag and then flattening the roll. In this sense, the airbag can be both rolled and folded although, in the flattened condition, the airbag 110 appears to be folded. The airbag 110 can also be Z-folded in a back-and-forth manner. The airbag 110 can also be flip-folded, in which the airbag is first folded, and then the folded airbag is rolled. The airbag 110 can further be folded to form pleats. It can therefore be seen that the airbag 110 can be placed in the stored condition through rolling, folding, or a combination or rolling and folding. The resulting stored condition of the airbag 110 can include rolls, folds, pleats, Z-folds, flip-folds, etc. In this description, the terms "rolled and/or folded" are meant to encompass any combination of these operations and the resulting stored condition of the airbag 110.

The airbag module 100 can be mounted to the roof 24 through a connection of the inflator 102 to the roof, e.g., via threaded fasteners. In this example implementation, the inflator 102 can be positioned inside the airbag 110 and can include threaded studs 106 (see, FIG. 2) that extend through corresponding holes or openings in the airbag and the housing 104. Connecting the inflator 102 to the roof 24 can create a clamping of the airbag 110 and housing 104 to the inflator. Alternatively, connecting the inflator 102 to other component(s) of the airbag module 100, such as a retainer (not shown) can assemble the airbag module 100 for subsequent installation in the vehicle 20, with the airbag 110 and housing 104 clamped between the inflator 102 and the retainer.

The safety system 10 includes an airbag controller unit (ACU) 12 that communicates with sensors 14 to detect the occurrence of an event, such as a vehicle collision, for which inflation of the airbag 110 is desired. Upon sensing, via the sensors 102, the occurrence of an event for which inflation of the airbag 110 is desired, the ACU 12 provides a deployment signal to the inflator 102 via lead wires 16. Upon receiving the signal from the ACU 12, the inflator 102 is actuated and provides inflation fluid to the airbag 110. The inflating airbag exerts a force on the housing 104, which causes the housing to open. This can be facilitated, for example, by fitting the fabric housing 104 with a tear seam. Because the airbag module 100 is likely also covered by vehicle trim, such as a roof liner or headliner, that structure can also be fitted with features, such as tear seams, that facilitate inflation and deployment of the airbag 110.

The airbag 110 inflates and deploys from the stored condition in the housing 104 to the deployed condition illustrated in FIG. 1. The airbag 110, while inflated, helps protect the vehicle occupant 40 by cushioning impacts with the occupant and providing a desired ride down effect.

The airbag 110 can be constructed of any suitable material, such as nylon (e.g., woven nylon 6-6 yarns), and can be constructed in any suitable manner. For example, the airbag 110 can include one or more pieces or panels of material. If more than one piece or panel is used, the pieces or panels can be interconnected by known means, such as stitching, ultrasonic welding, heat bonding, or adhesives, to form the airbag 110. The airbag 110 can be uncoated, coated with a material, such as a gas impermeable urethane, or laminated with a material, such as a gas impermeable film. The airbag 110 thus can have a gas-tight or substantially gas-tight construction. Those skilled in the art will appreciate that alternative materials, such as polyester yarn, and alternatives coatings, such as silicone, can also be used to construct the airbag 110.

The airbag 110 can be shaped and configured commensurate with the specific vehicle architecture in which the airbag module 100 is installed. Characteristics such as the width, height, depth, and chamber configuration of the airbag 110 can be selected in view of vehicle architectural considerations, such as cabin space (e.g., height, width, etc.), seating position (e.g., driver, passenger, front seat, rear seat), seat direction (e.g., forward-facing, rearward-facing, side-facing), and surrounding vehicle structure (e.g., instrument panel, steering wheel, seatback of a forward row seat, etc.).

The airbag 110 has a generally inverted L-shaped configuration and includes a base portion 112 and a cushion portion 114 that are in fluid communication with each other. The base portion 112 is an upper portion of the airbag (as viewed in FIG. 1) and includes those portions of the airbag that are secured to the airbag module 100, e.g., via being clamped to the inflator 104, as described above. The base portion 112 thus provides the connection of the airbag 110 to the airbag module 100 and the vehicle 20. The base portion 112 has first and second ends spaced along its length, as measured along a horizontal axis X of the base portion. The base portion 112 is configured so that its length extends along the vehicle roof 24 in the inflated and deployed condition of the airbag 110.

With the base portion 112 positioned against the roof 24, the cushion portion 114 extends from the base portion downward, away from the vehicle roof 24, into engagement with the occupant's lap, where the legs 50 and hips/buttocks 46 meet. To accomplish this positioning, the cushion portion 114 can be configured to deploy away from the roof and the base portion at an acute angle downward in the vehicle toward the vehicle seat 30, particularly toward an intersection of the seat back 36 and bottom cushion 34. The cushion portion 114 has an upper portion and a lower portion, as viewed in FIG. 1, that are spaced along its length, which is measured along axis Y. The upper portion of the cushion portion 114 is connected to an end of the base portion 112, thus forming the aforementioned inverted L-shape.

The cushion portion 114 is configured to receive and cushion the occupant 40, and can have a chambered design configured to provide this protection. The cushion portion 114 can, for example, have a chambered configuration in which a plurality of longitudinally (e.g., vertically) extending tubular chambers 120 are arranged parallel to each other along the length/height of the cushion portion. The chambers 120 can, for example, be formed by internal tethers 122 that interconnect a front airbag panel 124, which faces the occupant 40, to a rear airbag panel 126, which faces away from the occupant.

Implementing this chambered construction, the airbag 110 can, for example, include two internal tethers 122 that create three adjacent parallel chambers 120, three internal tethers that create four chambers, etc. The chambers 120 can be similar or identical in terms of size, shape, length, diameter, cross-sectional shape, etc. Alternatively, the chambers 120 can have different sizes, shapes, lengths, diameters, cross-sectional shapes, etc.

Whether the cushion portion 114 is chambered, and the particular chamber configuration of the cushion portion, is not material to the advantageous features of the airbag module 100 that are described herein. It should be appreciated that the airbag 110 can possess the advantageous construction, and display the advantageous performance disclosed herein, without chambers 120 or with chambers having virtually any chamber configuration.

Those skilled in the art of vehicle safety will appreciate that the ability of an airbag to effectively cushion an occupant and provide a desired ride-down effect depends on the presence of a reaction surface against which the airbag is pressed in response to occupant impacts. For example, in conventional first row frontal airbag implementations, driver airbags are steering wheel mounted and rely on the steering wheel as a reaction surface. Passenger airbags are instrument panel mounted and rely on the instrument panel as a reaction surface. In the vehicle 20 illustrated in FIG. 1, the roof-mounted airbag module 100 is implemented in a vehicle architecture devoid of traditional reaction surfaces.

To account for the lack of reaction surface in the vehicle 20, the airbag 120 can be configured to use both the roof 24 and the occupant 40 to effectively provide the reaction surface function. The connection of the airbag base portion 112 to the roof 24 is a secure structural support of the upper end of the airbag. The cushion portion 114 is configured to deploy a lower portion 130 into a space 132 where the occupant's legs 50 meet the torso 42, at or near the hips 46. As the occupant 40 leans forward in response to the crash, as indicated generally by the arrow labeled "B" in FIG. 1, the occupant's torso 42 (i.e., the chest and abdomen) impinges upon and grasps the lower portion 130 of the cushion 114.

As a result of the base portion 112 of the airbag 110 being secured to the vehicle roof 24 and the cushion lower portion 130 being grasped by the occupant 40 supported by the seat 30, the roof and the occupant/seat, in combination, form a reaction surface that allows the airbag to cushion the occupant and provide the desired ride-down effect. As the occupant 40 moves in the forward direction B, the occupant exerts a force on the airbag 110 that pulls the airbag away from the roof 24. At the same time, this occupant movement also compresses the cushion portion 114 between the head 44/torso 42 and the legs 50, which are supported by the seat 30, particularly the bottom cushion 34/base 32. As a result, the combination of the roof 24 resisting the pulling forces applied to the airbag 110 and the legs/seat supporting the compressive forces applied to the airbag by the impacting occupant 40 form the reaction surface that allows the airbag 110 to help protect the occupant.

Because the occupant 40 swings, pivots, or otherwise moves forward in response to the vehicle crash condition (see arrow B), care should be exercised so that the deploying airbag 110, particularly the cushion portion 114, does not impact the occupant's head 44. At the same time, it can be important for the cushion portion 114 to deploy in a manner that positions the lower portion 130 in the space 132. To achieve this positioning of the lower portion 130 while, at the same time, avoiding contact of the cushion portion 114 with the occupant's head 44, the airbag 110 can be configured so that the cushion portion deploys along an angled trajectory, indicated generally by the arrow labeled "T," at an angle indicated generally at angle "A" in FIG. 1. The angle A is measured with respect to the horizontal axis X of the base portion 112, as shown. The cushion portion 114 extends at angle A from an end of the base portion 112 that is distal with respect to the occupant 40 and the vehicle seat 30.

By configuring the cushion portion to inflate to the at the angle A, the deployment trajectory can be controlled in order to help avoid contact between the deploying airbag 110 and the occupant's head 44. Still, the occupant's head can be positioned high in the passenger compartment 22 and close to the vehicle roof 24 at the time of airbag deployment. The initial phases of airbag deployment can, however, be dynamic, and the initial deployment of the airbag, especially the fine movements thereof, can be unpredictable/unrepeatable from deployment-to-deployment. While the airbag 110, when fully inflated and deployed, reaches the position illustrated in FIG. 1 with a high degree of precision, the path that the airbag takes to reach this position might not be as precise. Thus, for example, while the airbag 110 is configured to deploy along trajectory T at angle A, the trajectory might not be precisely T and/or the angle might not be precisely A, especially during the initial phases of airbag deployment. Advantageously, however, the airbag module 100 is configured to help control the initial phase of airbag 110 deployment so that deployment of the cushion portion 114 is more predictably and reliably along trajectory T and angle A. As a result, contact between the deploying cushion portion 114 and the occupant's head 44 can be avoided in a more effective and reliable manner.

Figure 2:
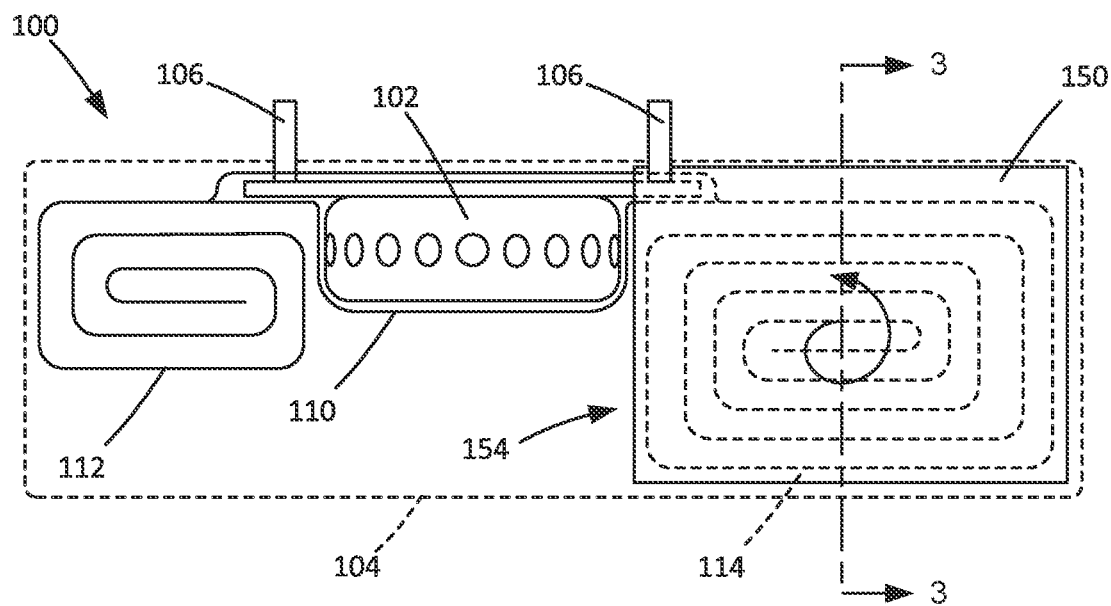
FIG. 2 is a schematic illustration of an airbag module portion of the apparatus of FIG. 1.
Figure 3:
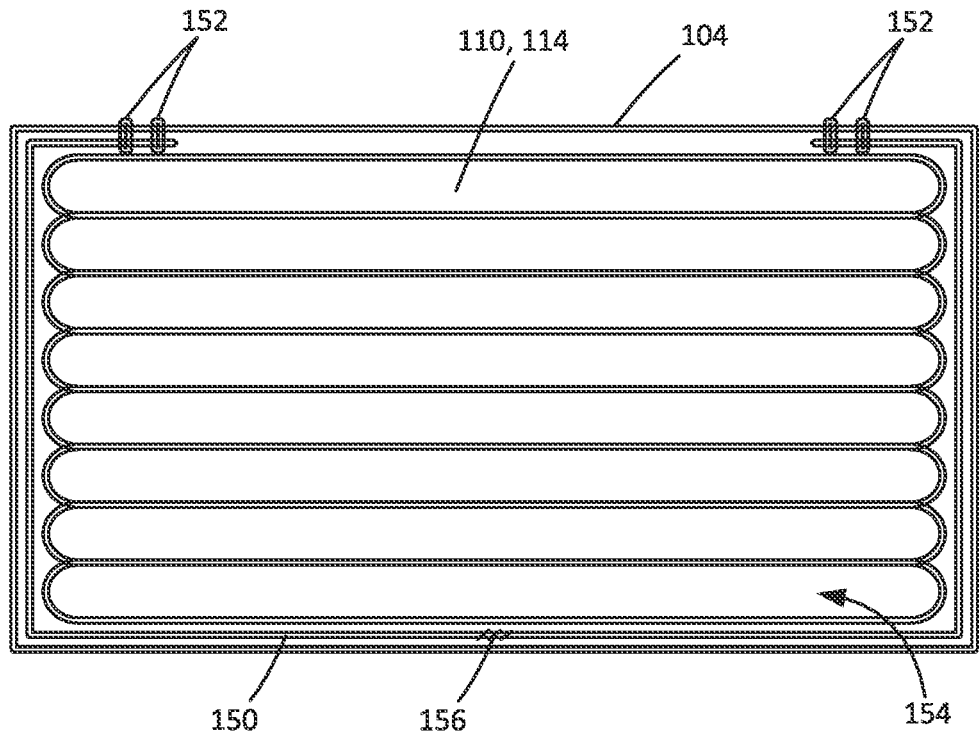
FIG. 3 is a schematic sectional view taken generally along line 3-3 in FIG. 2.

FIG. 2 illustrates the airbag module 100. In FIG. 2, the airbag housing 104 is shown in hidden lines so as to expose to view the remaining components. As shown in FIG. 2, the inflator 102 is positioned between the rolled and/or folded base portion 112 and cushion portion 114. In addition to being at least partially enclosed by the airbag housing 104, the cushion portion 114 is also contained in a deployment pocket 150. As shown in FIG. 3, the deployment pocket 150 wraps around and contains cushion portion 114 in its rolled/folded condition.

As shown in FIGS. 2-3, the deployment pocket 150 can be formed as a portion of the airbag housing 104. In this example configuration, the airbag housing 104 and the deployment pocket 150 can have a fabric panel construction, which permits the deployment pocket to be connected to the airbag housing via stitching, as indicated generally at 152 in FIG. 3. The fabric used to construct the housing 104 and/or the pocket 150 can, for example, be an airbag fabric similar or identical to that used to construct the airbag 110.

The airbag housing 104 and/or the deployment pocket 150 could have alternative configurations. For example, the housing 104 could have a more rigid construction, such as a plastic/polymer construction, and the fabric pocket 150 could be connected using stitching, clamps, mechanical fasteners, such as threaded fasteners or rivets, or a combination of these elements. The pocket 150 could also have a plastic/polymer construction. The material constructions of the airbag housing 104 and deployment pocket 150 are not important, as long as they function as described herein.

As the airbag 110 inflates and begins to deploy, the airbag housing 104 is configured to open and allow the airbag to pass into the passenger compartment 22. Advantageously, the base portion 112 of the airbag 110 is packaged separately from, i.e., to the left of, the cushion portion 114, as illustrated in FIG. 2. Because of this, the base portion 112 is packaged only by the airbag housing 104 and, of course, the headliner or any other roof trim that covers the airbag module 100. As a result, the base portion 112 inflates and deploys without additional delay or restriction.

The deployment pocket 150 initially restricts and thereby delays the initial deployment of the cushion portion 114, while the base portion 112 is permitted to inflate and deploy without added restriction. This initial restriction of the cushion portion 114 gives the base portion 112 a head start, allowing is to achieve an increased degree of inflation, deployment, and pressurization before the cushion portion.

The initial deployment of the base portion 112 while the cushion portion 114 is initially restricted and inhibited is illustrated in FIG. 4A.

As shown in FIG. 4A, the base portion 112 begins to deploy while the cushion portion 114 is contained by the deployment pocket 150. In FIG. 4A, the degree to which the base portion 112 is initially deployed, and the degree to which the cushion portion 114 is initially restricted is shown by way of example. The relative degrees of initial deployment and restriction of the base and cushion portions 112, 114 can vary, with the emphasis being placed not necessary on the deployment delay, but instead on the resulting trajectory of the cushion portion. Because factors, such as bag shape, deployment trajectory, cabin architecture and dimensions, and the position of the seat/occupant relative to the airbag module can vary from vehicle to vehicle, the requisite delay, and the configuration of the deployment pocket 150 necessary to achieve that delay, can vary.

The increased degree of inflation, deployment, and pressurization of the base portion 112 allows it to provide a more stable base from which cushion portion 114 deploys. The initial restriction of the cushion portion 114 is not long—just long enough to create a delay sufficient to improve the degree of inflation, deployment, and pressurization sufficient to provide a more stable base portion 112, and is based on the factors listed above.

As the airbag 110 continues to inflate, pressurization of the cushion portion 114 causes it to egress from the deployment pocket 150. This is shown in FIG. 4B. The deployment pocket 150 can be configured to release the cushion portion 114 in a variety of manners. For example, the deployment pocket 150 can be configured to rupture, e.g., at tear seams 156 (see FIG. 3). Alternatively, the deployment pocket 150 and curtain portion 114 can be configured so that the cushion portion exits the deployment pocket through the opening 154. Regardless, when this occurs, the deployment pocket 150 no longer restricts or inhibits inflation and deployment of the cushion portion 114.

The cushion portion 114 can be placed on the stored condition in a manner configured to facilitate its egress from the deployment pocket 150. For example, as shown in FIG. 2, the cushion portion 150 can be rolled into the stored condition in a manner such that it unrolls toward and out of the opening 154, as indicated generally by the spiral arrow in FIG. 2. In this manner, when the rolled-up cushion portion 114 initially receives inflation fluid, it will be urged against the deployment pocket 150 in a generally downward direction, and the pocket will initially restrict its deployment. As the cushion portion 114 continues to inflate, the unrolling will occur, which causes the cushion portion to move/roll along the fabric panel of the pocket 150 toward and out of the opening 154. Once the cushion portion 114 roll exits through the opening 154, it is released to inflate and deploy without restriction to the condition illustrated in FIG. 1.

To achieve this performance, viewing the stored condition of the airbag 110 in FIG. 2, it can be seen that the cushion portion 114 is rolled from the bottom up in a direction that is counterclockwise as viewed in FIGS. 1 and 2. This counterclockwise roll direction is opposite the clockwise direction in which the cushion portion 114 unrolls when inflated and deployed, i.e., opposite the spiral arrow in FIG. 2. As a result, when the cushion portion 114 is rolled-up into the packaged condition, it rolls along the panel forming the pocket 150. Accordingly, as shown in FIG. 2, the unrolling direction also rolls over the panel forming the pocket 150, as opposed to sliding along the panel. Because the inner rolls of the rolled-up cushion portion all move together/simultaneously during cushion unrolling, only a small degree of unrolling is required for the entire cushion portion 114 to exit the pocket 150. The restriction placed on the cushion portion 114 by the pocket, and the deployment delay imparted as a result, can be short and yet effective to permit the initial deployment of the base portion 112 and the stabilizing effect that its early deployment provides.

Once the cushion portion 114 is released from the deployment pocket 150, and owing to the fact that this delay has allowed the base portion 112 to undergo some degree of initial inflation, deployment, and pressurization, the base portion offers support and stabilization for the cushion portion that is improved over that which would occur if both portions inflated, deployed, and pressurized simultaneously. The restriction of the cushion portion 114, and the inflation/deployment timing that it imposes, helps avoid variability in its deployment trajectory that are associated with the unpredictable fine movements associated with unrestricted airbag deployment. As shown in FIG. 4C, the implementation of the deployment pocket 150 allows the cushion portion 114 to inflate and deploy more reliably at angle A along the desired deployment trajectory T. As a result, the airbag 100 can reach the desired inflated and deployed condition (see FIG. 1) repeatably and reliably.

From the above description of the invention, those skilled in the art will perceive improvements, changes and modifications in the invention. Such improvements, changes and modifications within the skill of the art are intended to be covered by the appended claims.

We claim:

1. An apparatus for helping to protect an occupant of a vehicle, comprising:
   an airbag configured to inflate and deploy away from a vehicle roof toward a vehicle seat, the airbag comprising an inflatable base portion configured to be connected to the vehicle roof and being inflatable from the vehicle roof to a deployed condition in which the base portion is positioned against and extends downward from the vehicle roof, and a cushion portion in fluid communication with the base portion and extending from the base portion toward the vehicle seat to an inflated and deployed condition in which the cushion portion is configured to receive and cushion an occupant seated on the vehicle seat; and
   a deployment pocket for initially restricting the deployment of the cushion portion without restricting inflation and deployment of the base portion.

2. The apparatus recited in claim 1, wherein the deployment pocket comprises a deployment opening through which the cushion portion deploys.

3. The apparatus recited in claim 2, wherein the deployment pocket is configured to release the cushion portion through the deployment opening in the deployment pocket without rupturing.

4. The apparatus recited in claim 2, wherein the cushion portion is packaged in the deployment pocket in at least one of a rolled- and folded condition configured so that when the cushion portion is inflated, the cushion portion unrolls and/or unfolds through the deployment opening.

5. The apparatus recited in claim 4, wherein the cushion portion is placed in the at least one of a rolled and folded condition from a bottom up in a roll/fold direction configured to roll/fold into the deployment pocket along a pocket panel.

6. The apparatus recited in claim 2, further comprising an airbag housing that encloses the base portion and the cushion portion in a packaged condition of the airbag, the airbag housing being configured to rupture in response to initial airbag inflation and release the airbag for inflation and deployment, and wherein the cushion portion is also packaged in the deployment pocket inside the airbag housing.

7. The apparatus recited in claim 6, wherein the airbag housing comprises a fabric housing that at least partially surrounds the airbag in the packaged condition.

8. The apparatus recited in claim 6, wherein the deployment pocket comprises a fabric structure stitched to the airbag housing.

9. The apparatus recited in claim 6, wherein the deployment pocket is configured to restrict deployment of the cushion portion until after the airbag housing ruptures.

10. The apparatus recited in claim 6, further comprising an inflator for inflating the airbag, wherein the airbag housing encloses the airbag and the inflator in a packaged condition.

11. The apparatus recited in claim 1, wherein the deployment pocket is configured to rupture to release the cushion portion to inflate and deploy.

12. The apparatus recited in claim 11, further comprising an airbag housing that encloses the base portion and the cushion portion in a packaged condition of the airbag, wherein the airbag housing is configured to rupture in response to initial airbag inflation and release the airbag for further inflation and deployment, and wherein the deployment pocket is configured to rupture after the airbag housing ruptures in order to initially restrict inflation and deployment of the cushion portion.

13. The apparatus recited in claim 1, wherein:
the base portion has a first end and an opposite second end spaced along a length of the base portion, the base portion in the inflated and deployed condition being configured so that the length extends along the vehicle roof; and
the cushion portion is connected to the second end of the base portion and is configured to extend away from the roof and the base portion at an acute angle downward in the vehicle toward the vehicle seat.

14. The apparatus recited in claim 13, wherein
the base portion has an axis along which the length is measured, the base portion axis extending generally horizontally when the airbag is inflated and deployed; and
the cushion portion has an axis along which a length is measured, the cushion portion axis extending at an acute angle with the base portion axis in a downward direction away from the roof toward the vehicle seat.

15. The apparatus recited in claim 13, wherein the cushion portion is configured to extend toward an intersection of a seat back and a bottom cushion of the vehicle seat.

16. The apparatus recited in claim 15, wherein the cushion portion has an upper portion and a lower portion measured along a length of the cushion portion, the upper portion of the cushion portion being connected to the second end of the base portion.

17. The apparatus recited in claim 15, wherein the cushion portion is configured to engage an occupant in the area of the upper legs so that the upper legs help form a reaction surface for supporting the cushion portion.

18. The apparatus recited in claim 15, wherein the cushion portion is configured so that the vehicle roof and portions of the occupant positioned on the bottom cushion of the vehicle seat form reaction surfaces for the airbag.

19. The apparatus recited in claim 1, wherein the base portion is configured to support the cushion portion against the vehicle to control a deployment trajectory of the cushion portion.

20. An airbag module comprising the apparatus of claim 1, an inflator for inflating the airbag, and a housing for at least partially enclosing the inflator, deployment pocket, and airbag in a deflated and stored condition, wherein the airbag module is configured to be mounted to the vehicle roof.

21. A vehicle safety system comprising the airbag module of claim 20, a sensor for sensing the occurrence of an event for which airbag deployment is desired, and a controller operatively connected to the sensor and the inflator, wherein the controller is configured to actuate the inflator in response to the sensor sensing the occurrence of the event for which airbag deployment is desired.

22. The apparatus recited in claim 1, wherein the deployment pocket comprises a fabric structure that at least partially encircles the cushion portion in a pre-deployment stored condition of the cushion portion, the fabric structure restraining the cushion portion during initial stages of inflation of the airbag to initially restrict the deployment of the cushion portion, the fabric structure being configured to release the cushion portion after initially restricting the cushion to allow the cushion portion to inflate and deploy.

23. The apparatus recited in claim 1, wherein the cushion portion is configured to deploy into engagement with a lap of the occupant seated in the vehicle seat, wherein the airbag is configured so that the cushion portion undergoes compression between a torso of the occupant and the occupant's legs in response to forward movement of the vehicle occupant in response to a crash, wherein the compression of the cushion portion causes a pulling force to be exerted on the base portion, wherein the base portion, being supported against the pulling force by the vehicle roof, and the cushion portion being compressed between the occupant's torso and legs, in combination form a reaction surface for supporting the airbag against impact forces of the occupant.

24. An apparatus for helping to protect an occupant of a vehicle, comprising:
an airbag configured to inflate and deploy away from a vehicle roof toward a vehicle seat, the airbag comprising a base portion configured to be connected to the vehicle roof and a cushion portion in fluid communication with the base portion and extending from the base portion toward the vehicle seat to an inflated and deployed condition in which the cushion portion is configured to receive and cushion an occupant seated on the vehicle seat;
an airbag housing that encloses the base portion and the cushion portion in a packaged condition of the airbag; and
a deployment pocket for initially restricting the deployment of the cushion portion without restricting the base portion, wherein the deployment pocket is configured to rupture to release the cushion portion to inflate and deploy, wherein the airbag housing is configured to rupture in response to initial airbag inflation and release the airbag for further inflation and deployment, and wherein the deployment pocket is configured to rupture after the airbag housing ruptures in order to initially restrict inflation and deployment of the cushion portion.

\* \* \* \* \*